G. Schiller,
Meat Cutter.
No. 85,615. Patented Jan. 5, 1869.
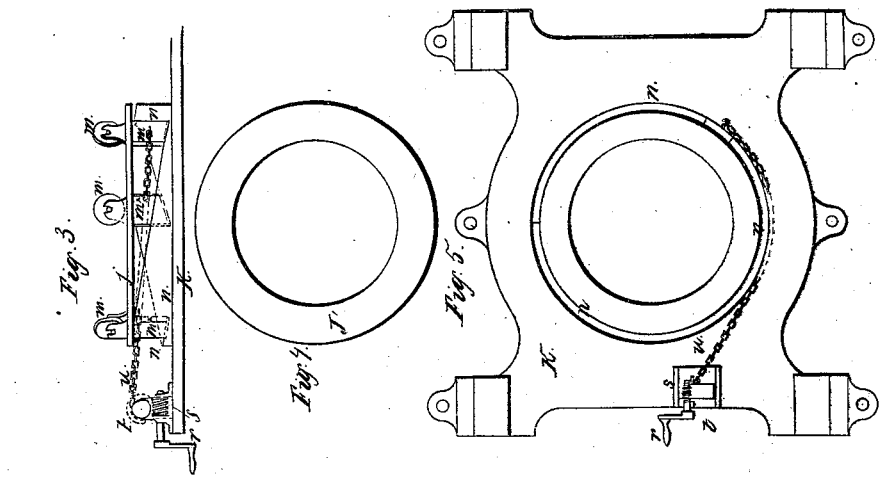
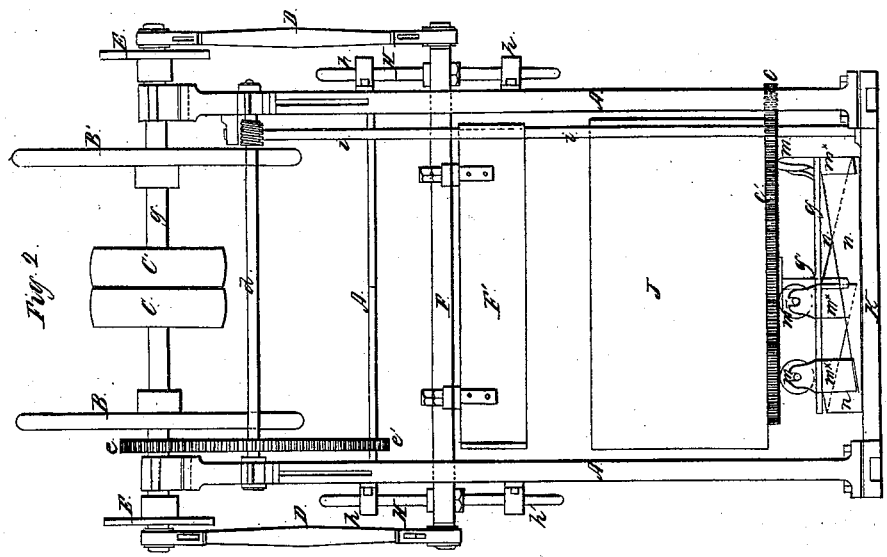
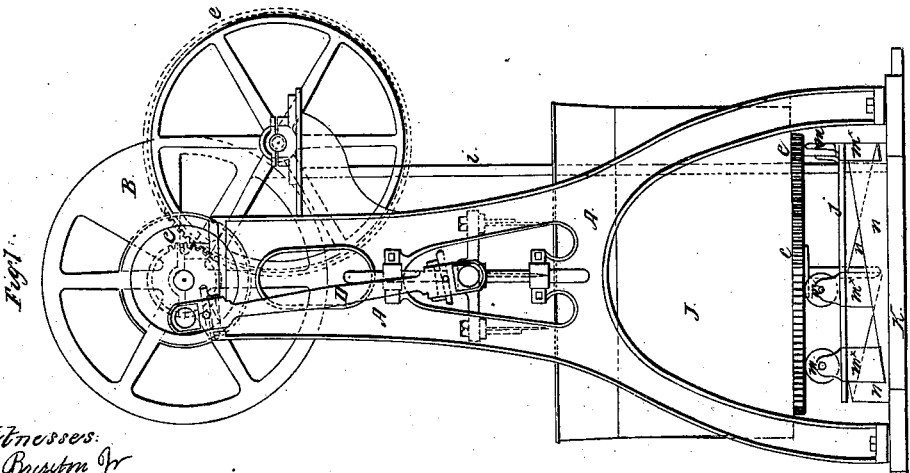
Witnesses: Inventor:
G. Schiller

CHARLES SCHILLER, OF BALTIMORE, MARYLAND.

Letters Patent No. 85,615, dated January 5, 1869.

IMPROVED MEAT-CUTTER.

The Schedule referred to in these Letters Patent and making part of the same.

*To all whom it may concern:*

Be it known that I, CHARLES SCHILLER, of the city of Baltimore, and State of Maryland, have invented a new and useful Improvement in Meat-Cutters; and I do hereby declare the following to be a full, clear, and exact description thereof, reference being had to the accompanying drawings, which are made a part of this specification.

My invention consists in a device, hereinafter described, by which the block upon which the meat is chopped may be raised as the block and knives wear away by constant use, and I am also enabled to raise the block so that the knives but just touch it, and do not bury themselves in it, so that the block and knives do not wear away as fast as in other machines.

In the drawings—

Figure 1 represents a side elevation of my machine.

Figure 2 is a front elevation, with the knives elevated.

Figure 3 is an elevation of my improved mechanism for raising the block up to the knives as the block becomes worn off.

Figure 4 represents a plan of an "extra ring," that is placed upon the raising-apparatus when the block is worn away so much that it cannot be elevated high enough to reach the knives.

Figure 5 is a plan view of the bed-plate, with raising-apparatus attached.

A A A may represent various parts of the stationary frame.

B B' are fly-wheels.

C and C' represent, respectively, a driving and a loose pulley on the shaft $g$.

D D are connecting-rods, which connect the crank-wheels E E to the cross-head F, to which the knives F' are secured.

The cross-head has secured to it, on each side of the machine, guide-rods H, which work in bearings $h$, instead of having bearings in the cross-head, to work upon stationary guide-rods, as is commonly done in other machines. By my invention the bearings of the cross-head are extended to a greater distance above and below, and will be less liable to wear away and allow the knives to shake or move about, and get bent or broken, which is often the case with machines where the guide-rods are made fast upon the stationary frame and the cross-head works upon them.

J is the block upon which the meat is placed to be chopped.

Rotary motion is communicated to the block J from the driving-shaft $g$, through the meda of the gearing $e\ e'$, horizontal shaft $d$, endless screw $d'$, vertical shaft $i$, and gearing $c\ c'$.

The block J may be provided, at top, with the customary rim or flange, to prevent the meat from being thrown off while being chopped, and is provided, at bottom, with a centre-pivot, $g'$, which turns in a suitable bearing on the bed-plate K.

The block also rests on a series of small rollers, $m$, supported upon a movable cam-plate, $j$, the cams $m^*$, on the bottom of which, ride upon stationary cams $n$, secured to the bed-plate K.

When it is desired to raise the block J, the cam-plate $j$ and its cams are drawn around a sufficient distance by means of the crank $r$, endless screw $s$, windlass $t$, and chain $u$.

When the block and knives become worn away so much that I cannot raise the block high enough for the knives to take effect, I place upon the bottom of the block, and upon the set of small rollers $m$, a ring, J', fig. 4, of any suitable thickness, and by this means am enabled to use the same block until it becomes too light to resist the stroke of the knives.

Having thus described my invention,

What I claim as new, and desire to secure by Letters Patent, is—

1. The combination of the movable cams $m^*$, cam-plate $j$, and stationary cams $n$, with the block J and bed-plate K, for the purposes described.

2. The windlass, with the chain $u$, attached to one of the movable cams $m^*$, for the purpose of drawing the said movable cams up and around on the stationary cams $n$, and thus elevating the block J any required distance, substantially as and for the purpose described.

3. The ring J', fig. 4, in combination with the cam-plate $j$ and rollers $m$, as and for the purposes explained.

To the above specification of my invention I have signed my hand, this 19th day of November, 1868.

C. SCHILLER.

Witnesses:
WM. H. BRERETON, Jr.,
W. B. DEMING.